Figure 4:
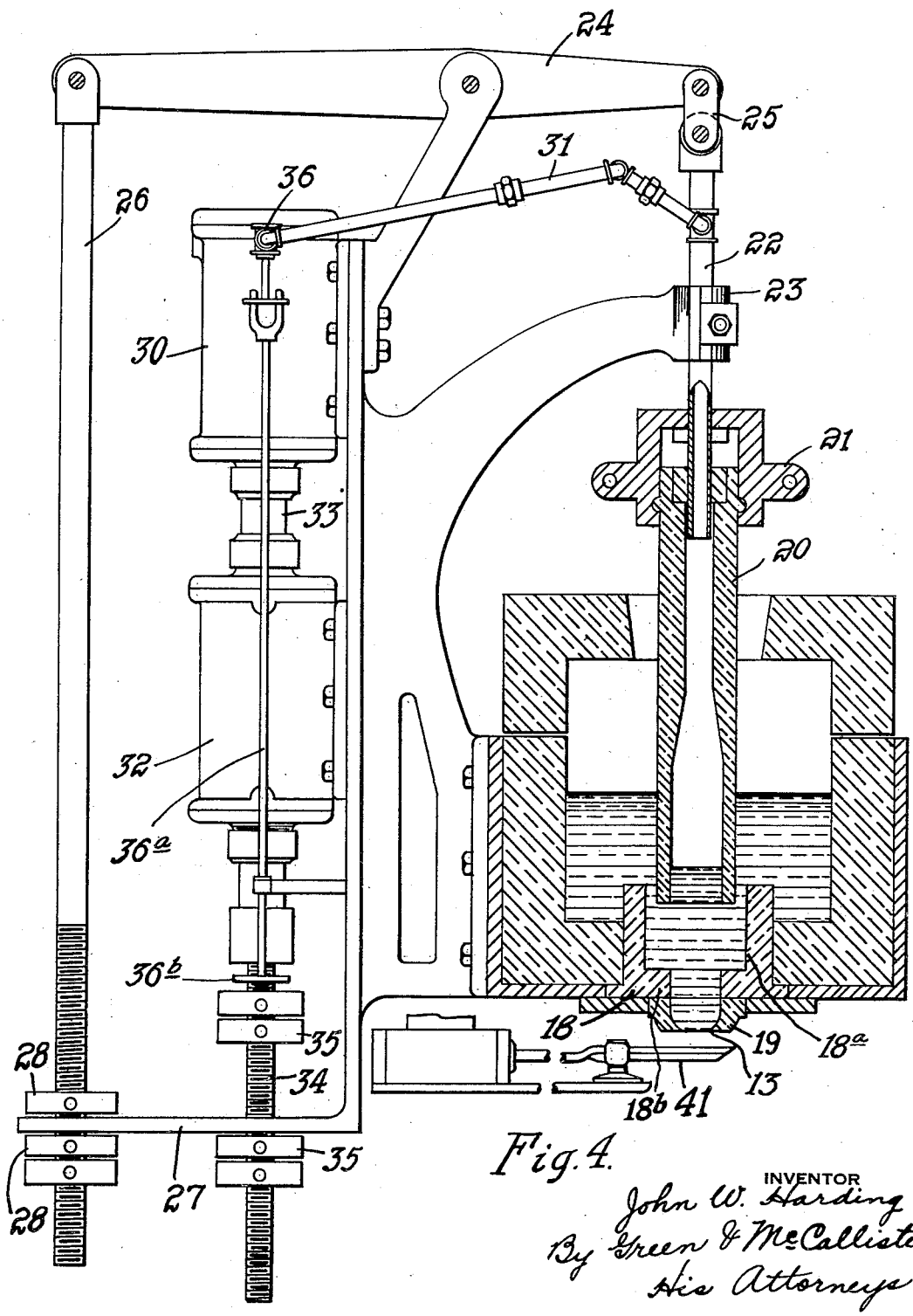

Nov. 7, 1933.  J. W. HARDING  1,934,676
APPARATUS FOR FEEDING MOLTEN GLASS
Filed July 26, 1929  3 Sheets-Sheet 1
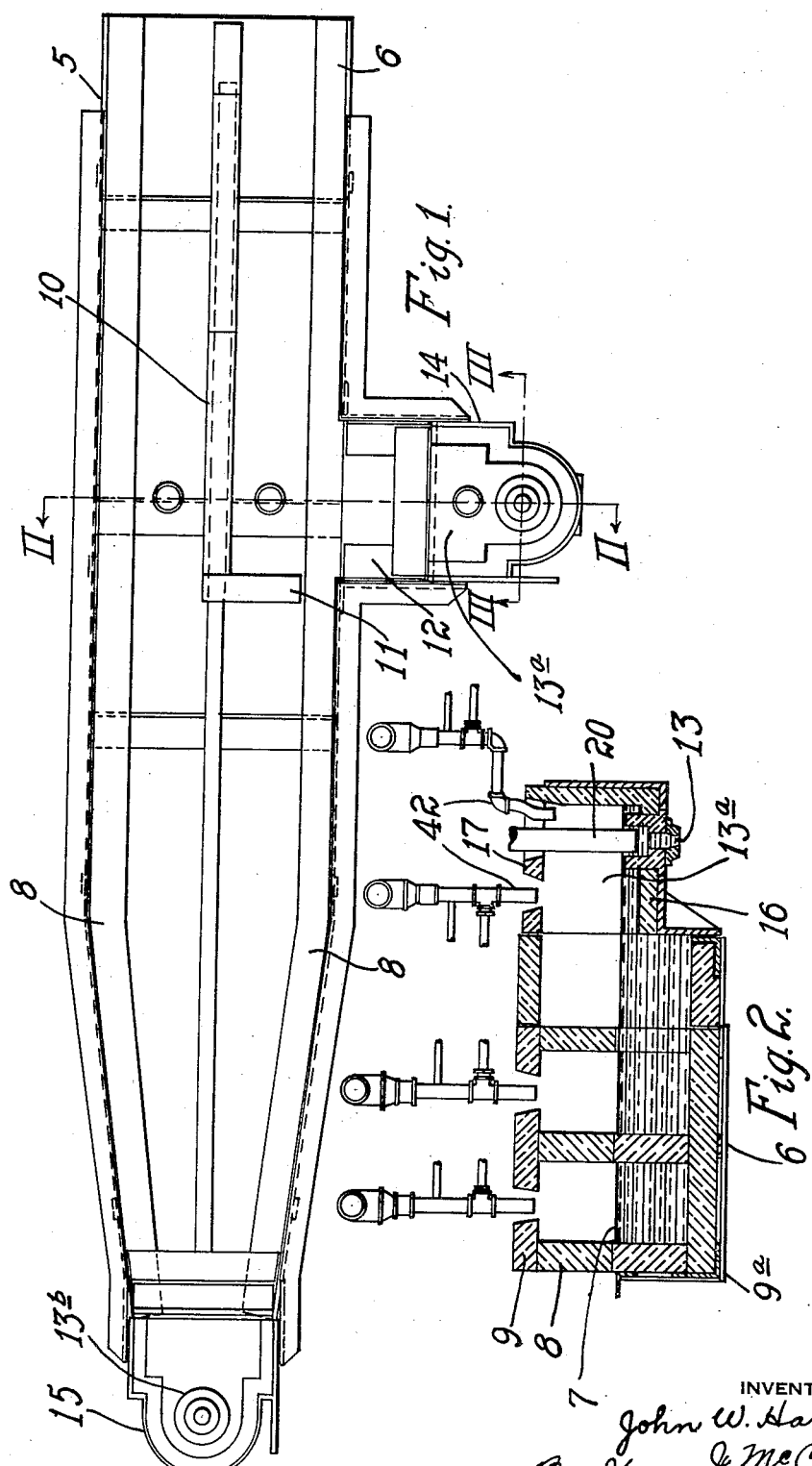
INVENTOR
John W. Harding
By Green & McCallister
His Attorneys

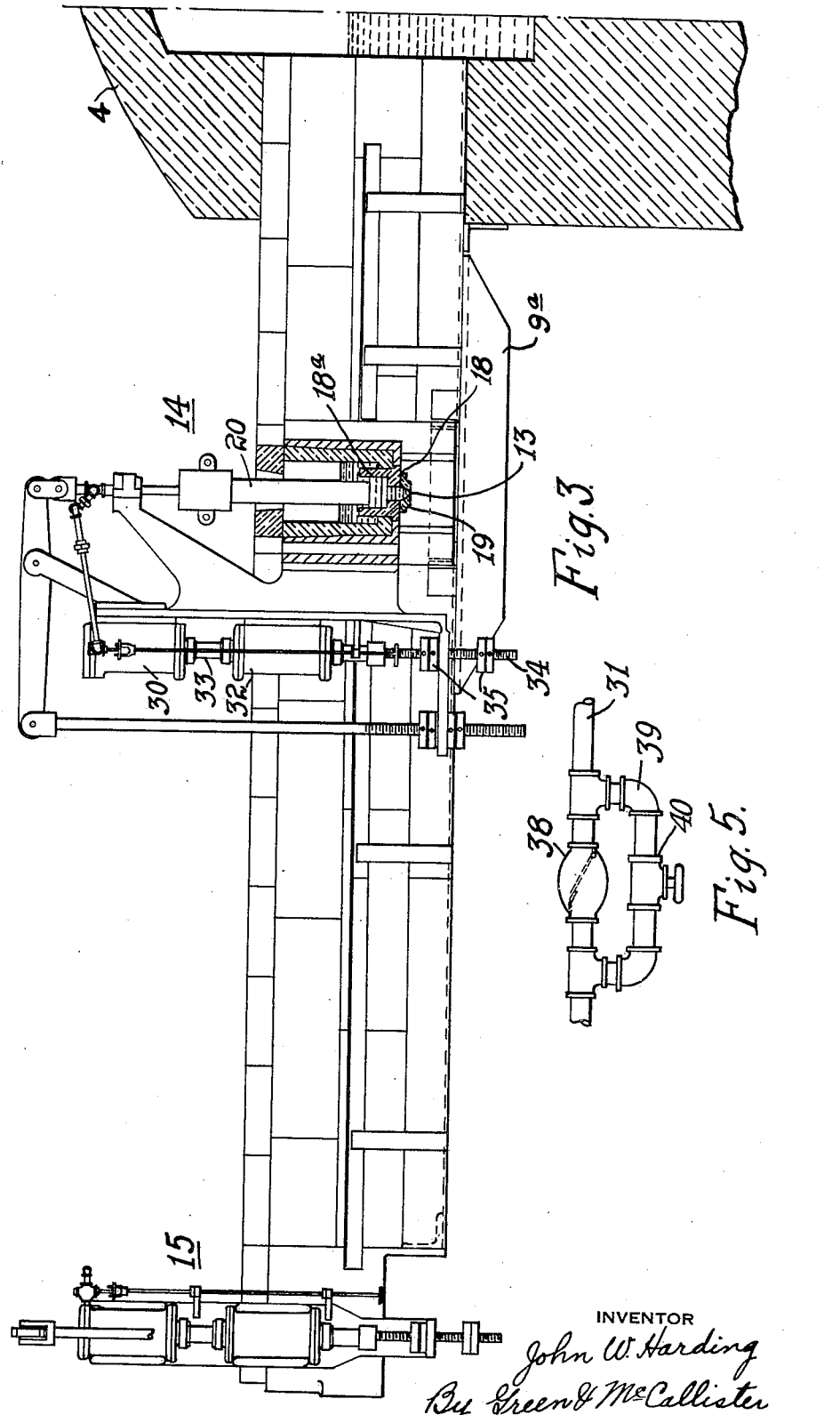

Patented Nov. 7, 1933

1,934,676

UNITED STATES PATENT OFFICE 1,934,676

APPARATUS FOR FEEDING MOLTEN GLASS

John W. Harding, Brockway, Pa., assignor to Brockway Machine Bottle Company, a corporation of Pennsylvania Application July 26, 1929. Serial No. 381,159

13 Claims. (Cl. 49—55)

This invention relates to apparatus for feeding molten glass to forming machines, such, for example, as well known pressing machines or well known press and blow machines.

As is well known, glass is melted and refined in a furnace or so called tank from which it is withdrawn while in the molten state for the purpose of being manipulated in the operation of forming it into a finished article or for the more specific purpose of being delivered to a forming machine.

My invention relates more particularly to the apparatus and the procedure employed in withdrawing the molten glass from a tank preparatory to the operations which form it into the finished articles such, for example, as tumblers, bottles, jars, insulators, lenses and the various other articles which are commercially known as glassware.

An object of my invention is to produce means for withdrawing the molten glass from a furnace or tank which will contribute to the greater usefulness of the tank, will save space, and will minimize expense by reason of the conservations above noted, and also by reason of the reduction in the number of operators necessary for operating or supervising the operation of the various mechanisms employed.

A further object is to produce a new and improved mechanism for forming measured charges of molten or plastic glass preparatory to, or in the operation of delivering such charges to a forming machine.

A further object is to produce such a mechanism which is simpler, both in construction and in operation than other similar mechanisms now in use and known to me.

These, and other objects, which will be made more apparent throughout the further description of my invention, are attained by means of the apparatus illustrated in the accompanying drawings, in which Figure 1 is a plan view of an extension which constitutes an important feature of my invention. Fig. 2 is a fragmental sectional view along the line 2—2 of Fig. 1. Fig. 3 is a side elevation of the extension shown in Fig. 1 with a portion shown in section along the line 3—3 of Fig. 1. Fig. 4 is an enlarged view of a portion of the apparatus shown in Fig. 3. Fig. 5 is a diagrammatic view of a detail which may be employed in connection with the apparatus of Fig. 4.

One feature of my invention is a new and improved glass delivering extension so arranged that glass may be fed from it to a number of forming machines while maintaining the desired consistency of the glass for each such forming machine. One of the difficulties with the installation of feeders is that it is impossible to properly conserve space in the glass factory, since it has been assumed that each feeder must be located immediately adjacent to the tank or must be served through a separate extension. With an extension embodying my invention I am not only able to conserve space but I am able to so locate the feeders that one attendant may readily and easily oversee the operation of at least two feeders. It will also be apparent that the number of feeders employed in connection with a single tank can also be increased and without the possibility of drawing glass into the feeder before it is fully refined.

Another important feature of my invention is the feeding mechanism or so called feeder which is illustrated more or less in detail, in Fig. 4. Feeders for delivering molten glass from tanks and to forming machines or molds are old and well known. Various types of such feeders have been, and are now, in commercial use. The feeder here illustrated embodies the operating principles of the so called Hitchcock feeder, which is illustrated and described in United States Patent 805,068, of November 21, 1905. As is clearly disclosed in that patent, the feed of molten glass is controlled by variations in air pressure, both for the purpose of timing the delivery of the mold charges and of varying the weight or size of such charges. The patent also discloses shears for severing the mold charges from the gather or accumulation of glass at the orifice in a regulable timed relation with the operation of the pump which produces the regulated or desired variations in air pressure. All these features are present in the feeder embodying my invention and the present invention is an improvement on this so called Hitchcock feeder which renders it more adaptable for use, by increasing its durability and its flexibility or the range of possible variations in the size or weight of the charges of glass delivered.

Referring more particularly to Figs. 1, 2 and 3: The extension illustrated as an embodiment of one feature of my invention is adapted to deliver molten glass to two feeders in the proper condition to two feeders, each of which embodies the feature illustrated in Fig. 4. The extension communicates at one end 5 with the furnace or tank, in which the glass is melted and refined, and consists essentially of a trough or passageway for molten glass. The floor 6 of the extension is so located that it is above the bottom of the tank but below the glass level within the tank and preferably at a level to insure a depth of from seven to ten inches of molten glass 7 within the extension. As illustrated in Fig. 2, the extension is fully enclosed except for such openings as are necessary for the delivery of molten glass and the introduction of heat by means of burners which are located adjacent to the points of glass delivery, as is the usual custom, and which may also be located at intermediate points along the line of travel of the glass toward the feeders.

As shown, the extension includes the floor 6, side walls 8 and a top cover 9, all formed of ceramic material, of the same character as the "clay blocks" used in the structure of tanks. It will, of course, be understood that this extension is properly supported by a steel framework 9a, capable of supporting the weight of the extension, the weight of the glass contained therein and the weight of such auxiliary apparatus as is employed in connection therewith. Any type of frame may be used which will provide a support of the character mentioned, and as such supports are well known in this art I have not illustrated the complete structure of the frame.

It is old practice to employ an extension or passageway from the tank to the feeding apparatus. The patent to which I have referred illustrates this in that it discloses a horizontal passage extending from the tank, at a point below the level of the glass contained therein, to a vertical passage which terminates in a glass delivery orifice at its lower end. The usual form of extension delivers molten glass to but one such delivery orifice and it is the general belief in the glass art that the temperature of the glass cannot be properly maintained and effectively controlled where an extension is employed for delivering glass to more than one feeder. With my present invention I am able to construct the extension so as to effectively deliver glass to a plurality of feeders, and the principle of my invention, as it involves the extension, is illustrated in connection with an extension for delivering glass to two feeders.

As illustrated, the depth of the extension is about twice the depth of the glass normally contained in it and, as I have stated, the extension is covered throughout its length with a top 9, formed of ceramic material. It is important that this material be of such character and thickness as to prevent an undue loss of heat. It is also important that the material be of such character as to effectively reflect heat downwardly upon the molten glass contained within the extension. These heat retaining and heat reflecting characteristics are also desirable in connection with the floor and side walls of the extension. While heat insulating material may be advantageously employed around the outside of the extension I have found that the ordinary "clay blocks", such as are usually employed in the construction of glass tanks, have the requisite characteristics when of proper thickness.

In the extension illustrated I employ a longitudinally extending partition 10, which terminates in a transverse partition 11, thereby forming within the extension two passageways, one of which communicates through a lateral offset 12, with a forehearth 13a, and the other with a forehearth 13b, both of which forehearths constitute a part of the glass delivery apparatus or the feeder illustrated diagrammatically in Fig. 1, but in more or less detail in Fig. 3. Both the partitions 10 and 11 extend from the floor to the top of the forehearth and thereby completely separate the two passages, except at the point of their communication with the furnace. With this arrangement the passage of the extension which supplies glass to the feeder most remote from the tank, widens out beyond the partition 11 providing, in effect, a large chamber which, under normal operating conditions, contains a large pool or mass of relatively quiescent molten glass, and the most remote feeder draws glass from this pool. The partition 10 extends back to, and preferably a short distance into the opening formed in the tank wall and through which the extension communicates with the interior of the tank; and it will be understood that the floor, side walls and top of the extension extend to the tank wall so as to, in effect, provide a continuation of that wall.

With such an arrangement glass is effectively delivered to both the feeders 14 and 15 and the temperature of each stream of glass so delivered may be independently controlled so as to deliver glass of the desired temperature to each feeder, even where the feeders are operating on glass of different temperature. This may be readily accomplished by employing properly located burners, in connection with the extension. As illustrated, I prefer to employ one or more burners 42 along the longer of the two passages and I employ the usual burners in connection with each forehearth, all as illustrated in Figure 2.

While I have illustrated two feeders I will describe the details of construction of but one of them, since they are preferably similar. Each forehearth is provided with a floor 16 which is preferably located somewhat above the level of the main floor of the extension but below the normal level of the glass contained within the extension. A glass delivery outlet is provided in the floor and the forehearth terminates in a rounded nose which partially surrounds the outlet and is so located with relation thereto as to form an adequate passageway for glass entirely around the outlet. As shown, the outlet is formed in a bushing 18 having an annular flange 18a which projects upwardly above the level of the floor of the channel and forms, in effect, a well or vertical passage which terminates at its lower end in an inwardly projecting annulus 18b, whose upper face lies on a flat or horizontal plane perpendicular to the vertical plane of flange 18a, in order that this face may form a seal with the lower edges of bell 20 when the latter is lowered to abutment, as is advantageous when orifice ring 19 is being changed or removed. The upper end of the flange 18a is normally submerged by the molten glass in the extension. The orifice or lower end of the outlet of annulus 18b is surrounded by an orifice ring 19, which may be changed for the purpose of changing the effective size of its orifice 13, and which is therefore removably mounted in place on the lower surface of the forehearth. With this arrangement it will be apparent that the orifice is in direct communication with the supply of glass from the well.

In order to control the delivery of glass through the orifice I employ what may be termed a bell 20. This bell is formed of ceramic material, is hollow and is removably mounted in a metallic cap 21 which is carried by a hollow rod 22, suitably supported in a guide 23, mounted on the frame of the extension. The cap 21, and consequently the bell 20, is capable of being adjusted to different positions in the well, formed by the flanges 18a, in that the cap is pivotally secured to a lever 24 by means of links 25, and the lever is capable of being tilted about its fulcrum point and held in different positions by means of a rod 26, which is threaded at its lower end, extends through a bracket 27, and is provided, above and below the bracket, with adjusting or positioning nuts 28.

The nuts 28 may be screwed to different positions along the rod 26 for the purpose of tilting the lever 24 and thereby adjusting the position of the lower end of the bell 20 with relation to the orifice 13 or the upper end of the annular flange 18a.

The flow of glass through the orifice is controlled by variations in air pressure within the bell 20. This is accomplished by means of a single acting pump 30, preferably of the sliding piston type, which alternately subjects the interior of the bell to super-atmospheric and sub-atmospheric air pressure. As shown, one end of the pump cylinder communicates with the interior of the bell through piping 31 which communicates with the interior of the hollow rod 22 and the rod communicates with the interior of the bell.

The piston of the pump 30 is actuated by a pump-like motor 32 of the type usually employed in connection with glass house machinery and which is preferably actuated by air pressure. The pistons of the pump 30 and motor 32 are preferably connected together by means of a piston rod 33, which extends through both cylinder heads of the motor 32 and is provided at its lower end with a threaded extension 34. This extension is shown slidably extending through a suitable opening formed in the bracket 27 and is provided, on either side of the bracket, with adjustable nuts 35, which may be screwed to different positions along the extension for the purpose of varying and controlling the throw of the pistons of both the pump and the motor in a two-way manner; in other words, the means may be adjusted to control both the forward and return strokes of the pump and its driving motor. In this way the degree of the super-atmospheric or sub-atmospheric pressure delivered to the bell 20 may be varied without varying the timing of the pump's reciprocations.

I also provide a regulatable valve 36 in the pipe line 31 for the purpose of further controlling the pressures delivered by the pump 30 to the interior of the bell. This valve may be, and preferably is of such character that it permits a relatively free flow of air in one direction, independently of its adjustment, but is capable of being adjusted to restrict the flow of air in the other direction. The reason for this is that different pumps differ in characteristics, due possibly to differences in the leakage past the pistons or through the various connections, and it is therefore desirable to be able to separately control the degree of super- and sub-atmospheric pressure delivered to the interior of the bell during each reciprocation of the pump. The valve 36 is shown provided with a long stem 36a which places the hand wheel 36b within easy access of the operator.

A simple substitute for the valve 36 is diagrammatically illustrated in Fig. 5, where the pipe line 31 is shown provided with a check valve 38 and a by pass 39 around the check valve in which a needle valve, or any valve 40, capable of giving an accurate adjustment of the passage therethrough, is located. With this arrangement the check valve 38 opens and permits a free flow of air to the bell 20 during the pressure stroke of the pump 30, but it closes during the vacuum or suction stroke of the pump and thereby imposes the control of the air flow from the bell to the pump, on the valve 40.

It will, of course, be apparent that if the characteristics of the pump are such as to occasion a piling up of the pressure delivered by it to the bell, with the tendency toward blowing out more glass than is sucked into the bell during the vacuum stroke, the check valve of Fig. 5 may be reversed so as to provide a free outflow of air from the bell but to prevent a free inflow into the bell. This may also be accomplished by turning the valve 36 end for end where that valve is a combination valve adapted to perform the function of the two valves 38 and 40 of Fig. 5.

It will, of course, be apparent that where the illustrated arrangement of valves 38 and 40 is employed, the degree of super-atmospheric or sub-atmospheric pressure which the pump 30 is capable of producing for any adjustment of its throw—i. e., for any given length of stroke—will not be materially modified, but the degree of sub-atmospheric pressure communicated to the interior of the bell will vary with the various adjustments of the valve 40 (or 36), since conditions within the cylinder of the pump 30 will change, due to normal leakage past the piston or the reversal of the piston's motion, before the minimum pressure occasioned by the pump can be communicated to the interior of the bell.

In Figure 4, I have diagrammatically illustrated a well known form of shears 41 for severing mold charges from the glass delivered through the orifice 13. As is customary the distance of these shears below the orifice may be varied to suit the conditions encountered and the shears will preferably operate in timed relation with the forming machine so that a charge of glass will be severed and dropped into a mold of the forming machine at the proper instant during the cycle of operation of the forming machine. The timing of such devices is old and well known in this art and for that reason need not be illustrated or further described.

It will, of course, be apparent that the piping connection 31 must be of such character as to accommodate or permit the adjustment of the bell 20 and that the connection between the piping 22 and the bell must be of such character as to minimize, as far as possible, the leakage of air from or into the interior of the bell.

In operation, the position of the bell is adjusted to the desired height and the motor 32, and the other apparatus associated therewith, such as the forming machine (not illustrated) and the shears 41, are prepared for operation by turning on the actuating fluid, which is usually compressed air. As the pistons of the pump 30 and motor 32 move upwardly, air under pressure is delivered to the interior of the bell, thereby forcing glass out of the bell and downwardly through the orifice 13, at which time the shears 41 are preferably retracted and opened, but in any event, are out of the line of travel of the glass issuing from the orifice. The maximum expelling pressure is encountered as the piston of the pump 30 reaches the upper limit of its stroke. The direction of movement of the pump piston is then reversed and the air pressure within the bell subsides and is finally reduced to a sub-atmospheric pressure. During this period the shears operate to sever a charge of glass from the quota delivered through the orifice and, the quota being relieved of the weight of the charge so severed, rises in response to the partial vacuum created in the bell, thereby lifting the severed stub from the shears and minimizing the shear mark and retracting at least a portion of the stub into the orifice. The degree or the intensity of the sub-atmospheric pressure obtained within the bell 20 will determine the effectiveness of the retractal movement of the glass at the orifice and the entire stub may be pulled back into the orifice, or the time of rendering the reduction in pressure within the bell most effective, may be varied with relation to the shear cut, all as indicated by the Hitchcock patent to which I have referred.

The effectiveness of the super-atmospheric and the sub-atmospheric pressures at the orifice 13 may also be varied by varying the position of the bell 20. One of the fundamental features of this apparatus is that by adjusting the position of the bell the weight or size of the mold charges delivered through the orifice may be controlled. It is, of course, apparent that variations in the throw of the piston 30 will have a controlling effect on the amount of glass delivered through the orifice during each cycle of the apparatus, but it will also be apparent that a nice control of weight may be obtained by varying the position of the bell with relation to the well.

The external diameter of the bell is such, with relation to the internal diameter of the well, that a substantial clearance is maintained between the two opposed cylindrical surfaces so that there is no chance of a clay to clay contact and also so that the interior of the bell will be in substantially free communication with the main body of glass contained within the forehearth for all positions of the bell with relation to the upper edge of the flange 18a. The more or less restricted passage between the bell and the flange will occasion a resistance of flow from the main body of glass, above the flange, into the bell and will also occasion a similar resistance to flow from the well to this main body of glass. As the bell is lowered into the confines of the flange, the length of the restricted passage is increased with the result that the resistance to glass flow through it is also increased. It therefore follows that with a given partial vacuum in the bell a decreasing amount of glass will be drawn into the bell as it is lowered; but on the other hand, the effect, at the orifice 13, of the introduction of super-atmospheric pressure into the bell will be increased, since the tendency for the glass to flow upwardly around the bell will be decreased. With these facts in mind it will be apparent that raising the bell will have the effect of increasing the size or weight of the accumulation of glass discharged through the orifice 13 during the cycle of operation; and it will also be apparent that the super-atmospheric pressure introduced into the bell for accomplishing the expulsion of glass through the orifice 13 may be and ordinarily should be reduced as the bell is lowered.

The arrangement of nuts 35, shown on the extension 34 of the piston 33, is such that the length of stroke of the piston of the pump 30 may be varied by varying either the upper or lower, or both limits of its stroke. This gives a wide range in the variations in pressures which may be produced by that pump and therefore, with the adjustment for the bell, and the adjustable valve 36 permits of a wide range of weight variation without the necessity of changing the size of the orifice ring 19 or the size of the bell 20 and its cooperating flange bushing 18.

If it is desired to check the gravity flow of glass through the orifice, after the pump 30 has been stopped, the bell may be moved down into the well to such a position that its lower end is in close proximity with the reentrant shoulder 18b of the bushing which is located between the orifice and the flange 18a. This permits making changes on the forming machine and also changing of the orifice ring 19 without emptying the forehearth and without the necessity of employing means for blocking off the forehearth to prevent a flow of glass from the furnace during the "shut down" period. The elevated flanges 18 also contribute to the advantages of the apparatus, both during the operation of the feeder and while the feeder is shut down. It will, of course, be understood that care must be taken in heating up the parts before operations are resumed so as to avoid breaking the bell when it is again lifted to the operating position.

One of the principal advantages of the flange 18a is that the variations in pressure within the bell are rendered more effective at the orifice and in this way the various adjustments of the feeder are rendered more effective in the control of the weight of the charges and in the control of the extent and time of the extrusion and retraction of molten glass at the orifice.

For the purpose of properly controlling the temperature of the glass, I employ two burners 42 in connection with each forehearth. These burners project through suitable openings formed in the top of the forehearth and one is preferably located on the entrance side and the other beyond the bell 20 so as to prevent cold spots or cold areas around the delivery orifice. In Figure 2, I have also shown similar burners located in the passages of extension. It will, of course, be apparent that where more than one burner is desirable, as for example, in the longer of the two passages of the extension, additional burners may be employed. It may also be desirable to incline these burners so that the jet of flame introduced into the passage extends downwardly but in the same general direction as the flow of glass through the passage. It is apparent that the function of the burners in the passages is not so much to raise the temperature of the glass as it is to maintain the temperature and by inclining the burners in the direction of glass travel, localized heating or spot heating will be avoided and the temperature of the glass can be just as effectively controlled. In the forehearth localized heating is desirable although of course it will be apparent that each of the burners employed in the forehearth is of such character as to heat a relatively large area with the result that the entire surface of the glass within the forehearth is subjected to the combined heating effect of the two burners. The burners illustrated are of the usual construction and are merely diagrammatically shown.

It will, of course, be apparent that various changes, modifications and additions and omissions may be made in the apparatus illustrated without departing from the spirit and scope of my invention as set forth by the appended claims.

What I claim is:

1. A glass feeder including a forehearth having a well terminating in and in communication with a submerged flow orifice of a diameter less than that of the well, a bell extending downwardly through the surface of the glass contained within said forehearth and projecting into said well, said bell having an interior cavity of a diameter greater than that of said orifice, said bell being stationary during normal operation of the feeder, and means for periodically delivering a variable fluid pressure to the interior of the bell to control the flow of molten glass through said orifice.

2. A glass feeder including a forehearth having a submerged well of single wall construction terminating in a submerged flow orifice of a diameter less than that of the well, a bell extending downwardly through the surface of the glass contained within the feeder and projecting into said well, said bell having an interior cavity of a diameter greater than that of said orifice, and means cooperating with said bell for aiding a glass feed of said orifice.

3. A glass feeder comprising a forehearth having a submerged single wall well terminating in a submerged flow orifice of less diameter than that of the well, a bell extending downwardly through the surface of the glass contained within the feeder and projecting into said well and having an interior cavity of greater diameter than said orifice, said bell being stationary during normal operation of the feeder, means for adjusting the position of the bell with relation to the orifice, and means for periodically delivering a variable fluid pressure to the interior of the bell to control the flow of molten glass through said orifice.

4. A glass feeder including a forehearth having a submerged-single-wall well terminating in a submerged flow orifice of less diameter than that of the well, a bell extending downwardly through the surface of glass contained within the feeder, said bell projecting into said well and having an internal cavity of a diameter greater than that of the orifice, said well having a submerged upwardly extending annular flange spaced from and surrounding said orifice, said flange terminating in an inwardly projecting annulus adjacent the flow orifice, an upper face of said annulus having a diameter greater than the outside diameter of the extending end of said bell, and means for adjusting the position of said bell with relation to said annulus, so that said bell may be employed to close off the forehearth by abutment with the annulus when adjustments are being made in the feeder.

5. A glass feeder comprising a forehearth having a submerged flow orifice formed therein, a submerged annular flange spaced from and surrounding said orifice and extending upwardly toward the surface of the glass over said orifice and constituting a well in open communication with said orifice, a bell having an internal chamber of greater diameter than said orifice projecting into the confines of said flange, and means for alternately subjecting the interior chamber of said bell to super- and sub-atmospheric pressure.

6. A glass feeder comprising a forehearth having a submerged flow orifice formed therein, a submerged annular flange spaced from but surrounding said orifice and extending upwardly toward the surface of the glass over said orifice and constituting a well in open communication with said orifice, a bell having an internal diameter greater than said orifice projecting into the confines of said flange, means for periodically varying the pressure within said bell, and means for adjusting the position of said bell along said flange.

7. A glass feeder including a forehearth having a submerged flow orifice formed therein, a submerged flange spaced from and surrounding said orifice and extending upwardly towards the surface of glass over the orifice and constituting a well having a bottom in open communication with the orifice, a bell extending downwardly into the glass and into the confines of said flange and having an internal cavity of greater diameter than the orifice, means for adjusting the position of said bell along said flange, means for periodically subjecting the interior of the bell to a sub-atmospheric pressure, and shears located below said orifice for periodically cutting off glass gobs delivered by the orifice.

8. In combination with a glass melting tank, an enclosed extension communicating with said tank, a partition within the extension dividing the interior thereof into glass delivery passages of different length, each extending from the tank to a glass feeder, the longer of said passages providing an enlarged chamber for the glass at a point intermediate its ends, glass feeders at different points along said extension, and burners located along the longer of said passages.

9. In combination with a glass melting tank, an enclosed extension communicating with said tank, having its floor below the normal level of the glass within the tank and its top substantially above that level, partitions within the extension dividing the interior thereof into glass delivery passages of different length, each extending from the tank to a glass feeder, the longer of said passages being of substantially greater volumetric capacity intermediate its ends than at its ends, and glass feeders located at different points along said extension and each receiving glass from one of said passages.

10. A glass feeder including a forehearth having a well terminating in a flow orifice, a bell projecting into said well, a pump for delivering pressure into the interior of said bell, a pressure control piston for said pump, a bracket having an aperture, said piston having a rod extending through the aperture of said bracket, and adjustable means mounted on said extending piston rod adjacent opposite sides of said bracket for varying the throw of said piston with respect to each end of said pump.

11. A glass feeder comprising a forehearth having a submerged well formed in the floor thereof and terminating in an orifice of less diameter than said well, a bell projecting downwardly through the surface of the glass contained within the feeder and extending into said well and having an interior cavity of greater diameter than said orifice, a reciprocating pump for alternately creating super- and sub-atmospheric pressure within the interior of the bell, means for adjusting the position of the bell with relation to said orifice, means for varying the throw of said pump, and means between said pump and said bell for regulating the degree of pressure imparted to the interior of the bell by said pump.

12. A glass feeder comprising a forehearth having a submerged flow orifice formed therein, a submerged annular flange spaced from but surrounding said orifice and extending upwardly toward the surface of the glass within the feeder and constituting a well in open communication with said orifice and the glass supply within the feeder, a bell extending downwardly into the glass and into the confines of said flange and having an interior cavity of greater diameter than said orifice, a reciprocating pump for alternately creating super- and sub-atmospheric pressure within the interior of said bell, means for adjusting said bell to different positions with relation to said orifice, and means for regulating the degree of pressure imparted to the interior of said bell by said pump.

13. A glass feeder including a forehearth having an orifice formed in the floor thereof and adapted to be submerged by a body of glass contained therein, a submerged annular flange axially aligned with the orifice and being spaced therefrom and extending upwardly towards the surface of the body of glass, said flange constituting a well having an open bottom in communication with the orifice, a bell projecting downwardly through the body of glass and axially aligned with the orifice, said bell projecting into the confines of said flange and having an internal cavity of a diameter greater than that of the orifice, a reciprocating pump connected with the interior of said bell for alternately creating super- and sub-atmospheric pressures within said bell and for controlling the delivery of glass through the orifice, means for adjusting the stroke of said pump, means for regulating the flow of air between said pump and said bell, and means for adjusting the position of said bell with respect to said orifice.

JOHN W. HARDING.